United States Patent
Tirelli

[11] 3,967,648
[45] July 6, 1976

[54] HYDRAULIC VALVES DIRECTLY CONTROLLED BY EITHER DIRECTOR ALTERNATING CURRENT

[75] Inventor: Paolo Tirelli, Cinisello Balsamo (Milan), Italy

[73] Assignee: Atos Oleodinamica S.p.A., Milan, Italy

[22] Filed: May 9, 1974

[21] Appl. No.: 468,264

[30] Foreign Application Priority Data
Jan. 2, 1974 Italy .................................. 19002/74

[52] U.S. Cl. .......................... 137/625.65; 251/129; 251/137
[51] Int. Cl.[2] ........................................ F16K 31/06
[58] Field of Search ............... 137/625.65, 625.64; 251/129

[56] References Cited
UNITED STATES PATENTS

| | | | |
|---|---|---|---|
| 2,630,136 | 3/1953 | Brandes et al. | 137/625.65 |
| 2,910,089 | 10/1959 | Yarber | 137/625.65 |
| 3,327,264 | 6/1967 | Rodaway | 251/129 X |
| 3,554,234 | 1/1971 | Kurtz | 137/625.64 |
| 3,701,366 | 10/1972 | Tirelli et al. | 251/129 X |
| 3,757,263 | 9/1973 | Saarem et al. | 251/129 X |

*Primary Examiner*—Arnold Rosenthal
*Attorney, Agent, or Firm*—Diller, Brown, Ramik & Wight

[57] ABSTRACT

An electromagnetic valve for fluid-dynamic controls is disclosed, which comprises, in addition to the usual valve body and slider, a pressure-tight cylinder made integral with the valve body and coaxial with the slider, communicating with a portion of the valve touched by the hydraulic fluid. This valve portion contains a portion of the fixed magnetic armature and within the latter slides, in contact with its inner wall, the movable magnetic armature, a coil comprising the energization coiling proper and a portion of the fixed magnetic armature, is separated from and slipped onto the pressure-tight cylinder. The result is that the sealing means and gaskets are reduced to a minimum, the assembly is more compact and the operation more reliable.

22 Claims, 10 Drawing Figures

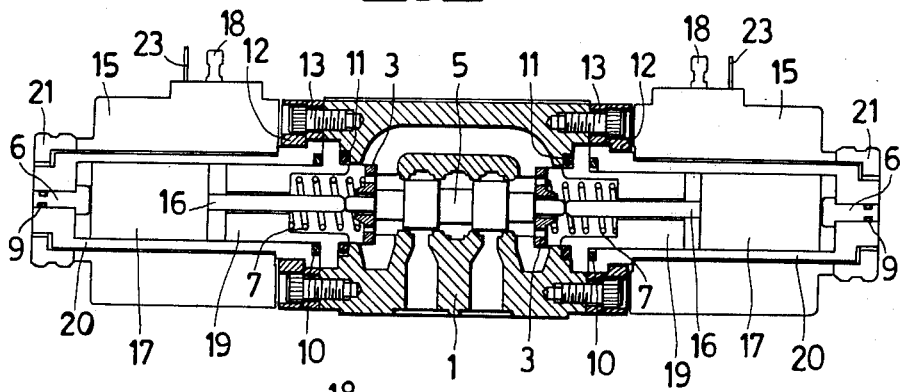
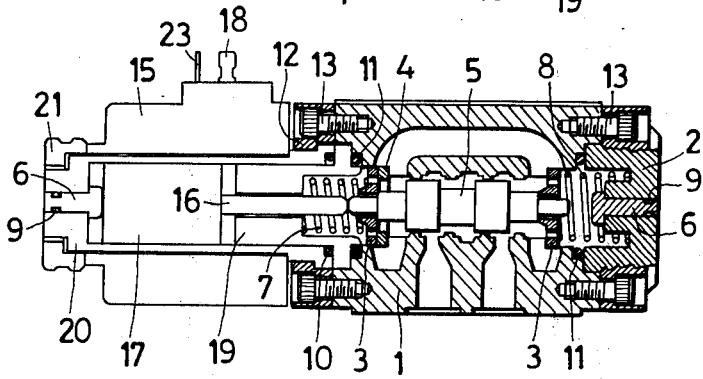
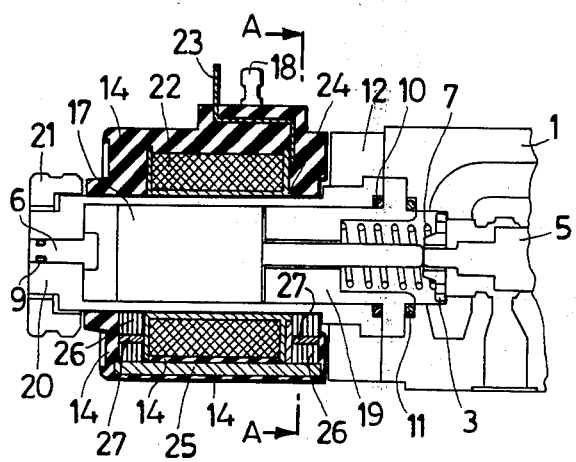
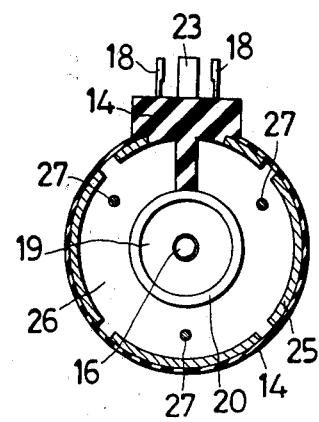

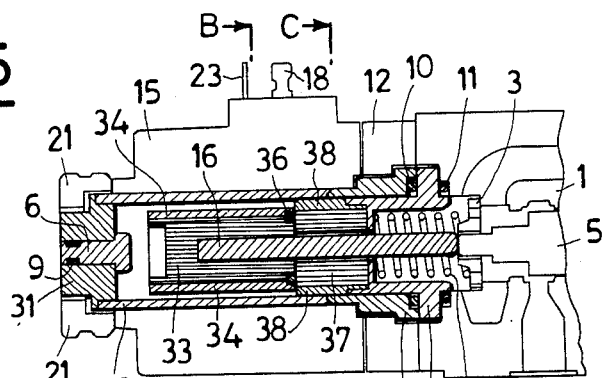
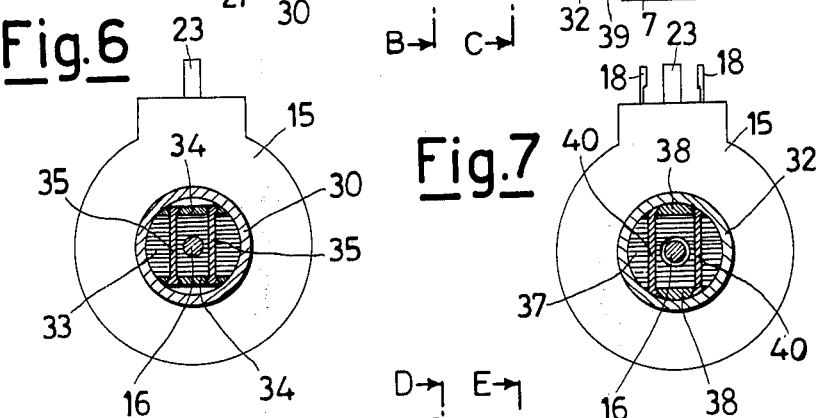
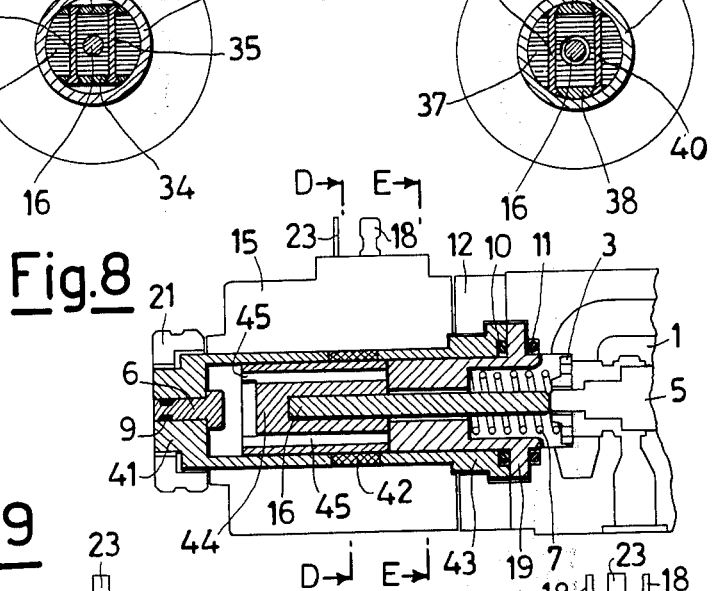
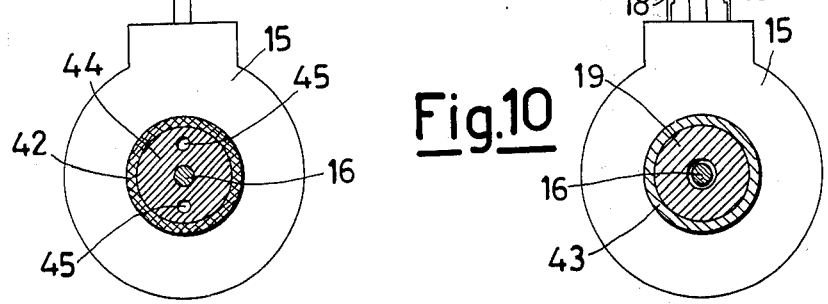

HYDRAULIC VALVES DIRECTLY CONTROLLED BY EITHER DIRECTOR ALTERNATING-CURRENT

This invention relates to valves which are electromagnetically controlled (electromagnetic valves) for fluid-dynamic controls and more particularly 3-way or 4-way electromagnetic valves in which the distribution of the flow of the pressurized oil is effected by a slider which is linearly slid within a body through which the oil passageway ports are opened, due to the effect of movable components attracted in a magnetic field which is generated as an electric coiling is appropriately energized and to the bias of compressed springs.

For fluid-dynamic controls (hydraulic or oil controls) it is intended the control effected by any appropriate fluid, also other than oil provided it has certain lubricating properties, and more particularly synthetic non-flammable liquids (phosphoric esters and/or chlorinated hydrocarbons), synthetic liquids in general, mixtures of water and glycols, or water and oil and so forth.

The electromagnetic valves for fluid-dynamic controls as available on the market nowadays comprise a slider (cylindrical, square, etc.) which slides within a body, through which the oil passageway ports are formed, and to which electromagnets are applied which comprise a movable armature which, as the electric coiling is energized, transfers in some way its motion to the slider.

In the conventional electromagnetic valves the electromagnets often are discrete units which can be separated from the valve body and from the hydraulic circuitry so that the motion of the armature is transferred to the slider by pushers which protrude from the hydraulic valve body through appropriate pressure sealing means.

In the arrangements of this kind the magnetic portions and the energization coilings are contained in a prismatic casing which is usually separated from the fluid contained in the valve.

The defects of this kind of electromagnetic valve are essentially a result of the separation which exists between the hydraulic valve body and the movable armature, as represented by the pressure sealing means placed on the pushers; these sealing means are usually formed by a gasket and cannot be very stiff in that they would hinder the axial sliding of the pusher and thus drastically limit the possibility of pressurizing the parts of the valve body adjacent to the sealing means.

Such a gasket, in addition, as stressed during the movement of the pusher, undergoes deformation which lead to wear of the sealing surfaces with possible subsequent oozing of the hydraulic fluid towards the outside of the valve body.

In addition it is not possible to provide a constant lubrication to the contact surfaces of the magnetic armature and the guideways thereof, which are exposed to the aggressive action of the atmosphere and thus, during the movement of the movable armature, frictional forces are originated, due to the sliding of dry metal surfaces, the result being possible jammings of the valves.

These defects could be overcome by providing for the suppression of the gasket and allowing the hydraulic fluid to wet the electromagnet but, in the arrangements provided heretofore, there have been merely used electromagnets which were immersed in a casing capable of giving a pressure seal. In this way, since the fluid, in addition to wetting the iron components of the electromagnet, wets of necessity also the energizing coil, and since the hydraulic fluid can have an aggressive action towards the usual electric insulations, extremely drastic limitations are set up to the use and the service life of the electric portion of valves so constructed.

An object of the present invention is to provide an electromagnetically controlled hydraulic valve which has the purpose of doing away with the above enumerated drawbacks both as regards the limitation stemming from the presence of sealing means between the valve body and the electromagnets and as regards the pollution of the electric coiling by the hydraulic fluid while affording favourable features as to its use.

To this end, in fact, the valve is characterized in that it comprises, in addition to the valve body and the slider, a pressure-tight cylinder made integral with the valve body and coaxial with the slider, communicating with a valve portion which is interested by the hydraulic fluid, and within which there is a portion of the fixed magnetic armature, in the inside of which there slides, in contact with its inner wall, the movable magnetic armature, and a coil, comprising the energization winding and a portion of the fixed magnetic armature, which is separated from and slipped on the pressure-tight cylinder.

The pressure-tight cylinder is filled with the hydraulic fluid, can withstand without troubles even high pressures, and, on account of the sealtight property, the hydraulic fluid cannot emerge from the cylinder and cannot reach the electric coiling.

The movable magnetic armature is compelled to float within the hydraulic fluid by which is thus both protected and lubricated, and no gaskets are inserted between the movable armature and the slider, so that no wear problem exists.

The further main advantages of the electromagnetic valve the subject of the present invention are connected with the shape and the size of its magnetic-flux conducting portions which permit a satisfactory operation when the electric energization coil has either DC or AC flowing therethrough.

The magnetic structure of the valves the subject of the present invention is such, in fact, as to generate, around the electric coiling through which current is flowing, a magnetic flux whose flux lines are concentrated in the interior of the pressure-tight cylinder, where they take a trend parallel to the cylinder axis so as to originate a considerable attraction between the fixed magnetic counter-armature and the movable armature; both when the energization is made with alternating current and when it is made with direct current.

The magnetic field is efficiently created in that the fixed magnetic armature, even though it is formed by discrete iron elements, is so devised as to minimize the discontinuities along the preferential route of the magnetic flux, offering a gap with a considerable width only when the movable armature is far from the magnetic-counter-armature as contained in the pressure-tight cylinder.

The low magnetic impedance of the fixed magnetic armature is obtained by means of the careful conjunction of magnetically conductive parts which have contact surfaces where the magnetic flux is caused to flow; many of these parts, in addition, are formed so as to offer thin wall thicknesses, at least in a direction perpendicular to the magnetic flux lines, to the end of limiting the flowing, in the iron, of the eddy currents which are normally generated by the variations of a magnetic flux in an electrically conductive medium.

These expedients permit to adopt a single configuration of the electromagnetic implementation for the actuation of the hydraulic valve, even though the magnetic fields associated with the flow of direct and alternating currents have very different characteristics and effects when they are generated in the interior of an iron magnetic structure in which at least a part is movable and subjected to the field attraction.

For a better clarity, preferred embodiments of the electromagnetic valve with armatures sliding in pressure-tight cylinder according to the invention, will now be described with reference to the accompanying drawings wherein:

FIG. 1 is a longitudinal cross-sectional view of a 1-electromagnet, 4-way, 2-postion electromagnetic valve, in which the hydraulic portion has been predominantly shown.

FIG. 2 is a longitudinal cross-sectional view of a 2-electromagnet, 4-way, 3-position electromagnetic valve in which the hydraulic portion has been predominantly shown.

FIG. 3 very clearly shows, in longitudinal view, the electric portion of an electromagnetic valve, said part being herein called the coil.

FIG. 4 is a cross-sectional view, taken along the line A—A of the coil of FIG. 3, which clearly shows the structure of the coil.

FIG. 5 clearly shows, in longitudinal view, the electromagnetic portion of an electromagnetic valve in its preferred embodiment for AC, with the armature in contact with the magnetic-counter-armature.

FIGS. 6 and 7 are cross-sectional views taken along the lines B—B and C—C, respectively, of the electromagnetic portion of an electromagnetic valve in the embodiment which is preferred for AC.

FIG. 8 clearly shows, in longitudinal view, the electromagnetic portion of an electromagnetic valve in the embodiment which is preferred for DC, with the armature in contact with the magnetic counter-armature.

FIGS. 9 and 10 are cross-sectional views, taken along the lines D—D, and E—E, respectively, of the electromagnetic portion of an electromagnetic valve in an embodiment which is preferred for DC.

Having now particular reference to FIGS. 1 and 2, the electromagnetic valve in question comprises a valve body 1 of alloyed cast iron and in whose parallelepipedal form there are obtained, by casting, suitably shaped empty spaces to allow the flow of an hydraulic fluid and a slider 5, which, taking the permitted positions, either opens or closes the passageway ports permitting the oil flow in the desired directions.

On the slider 5 are active the helical springs 7 and/or 8 through disks 3; since the disks 3 abut the body 1 either directly or with the intermediary of the spreader 4, the positioning of the slider 5 is ensured with an extreme accuracy and reliability.

With reference to FIG. 1, the body 1 of the electromagnetic valve is closed on a side by the bottom piece 2, secured to the body 1 by screws 13, and the oiltightness is obtained by the appropriate compression of the sealing ring 11 between the body 1 and the bottom piece 2; the pusher for the manual actuation, 6; inserted in the bottom piece 2, permits the manual positioning of the slider 5 whenever this is desired and the sealing ring 9 prevents oil oozings all around the periphery of the pusher 6. On the other side, the pressure-tight cylinder 20, kept in position by the flange 12, made integral with the body 1 by screws 13, presses the sealing ring 10 against the magnetic counter-armature 19, which, in its turn, presses the sealing ring 11 against the valve body 1.

The result is thus that the sealing rings 10 and 11, properly compressed in their seatings, prevent oil oozings through the contact surfaces between the body 1 and the bottom piece 2, and the parts 19 and 20, respectively.

The pressure-tight cylinder 20 is firmly attached to the valve body 1, is filled with the hydraulic fluid which from the valve body 1 flows into the cylinder 20 through the axial bore of the counter-armature 19 and has at its end the manual-actuation pusher 6, which is peripherally sealed by the gasket 9.

Within the pressure-tight cylinder 20 the movable armature 17 slides, which transfers its motion to the slider 5 via the rod 16, passed through a bore formed in the magnetic counter-armature 19.

On the pressure-tight cylinder 20 there is slipped the coil 15, held by the ferrule 21 which is engaged by a screw-thread formed in the end portion of the pressure-tight cylinder 20; from the outer surface of the coil 15 project the electric terminals 18, which are metal plates connected to the electric coiling, and the ground terminal 23 which is connected to the iron components of the coil 15.

With particular reference to FIGS. 3 and 4 it can be seen that the portion 15, indicated with the name of coil, is substantially formed by an electric energization winding 22, contained in a supporting member 24 made of a rigid dielectric material, by two annular members formed by magnetic metal sheets 26 which are shaped, superposed and formed into a pack by the rivets 27, and a magnetic hood 25 having a tubular form and by a conventional encapsulation of plastics material 14.

The encapsulation of plastics material, 14, has a general shape of a solid of rotation and has a planar projection on which the terminals 18 of the energization electric coiling and the ground terminal 23 are housed.

The tube 25 has a longitudinally oriented slot and the sheet metal packs 26, which are peripherally in contact with the tube 25, have a radially oriented slot which, as of the encapsulation, is filled with plastics material 14.

The plastics material 14 has good dielectric properties and is heat conductive, having favourable characteristics as to its moldability both by injection and casting.

The coil 15, along with the pieces 14, 18, 22, 23, 24, 24, 26, 27 is maintained in position on the pressure-tight cylinder by the screwed ferrule 21.

With reference to FIG. 1, the movement of the slider 5 and is positioning relative to the body 1 is obtained by the concurrent or independent action of the rod 16, which is integral with the movable armature 17, and by the springs 7 and 8: the slider 5 is stably maintained in the at rest position (electromagnet not energized) by the actuation of the spring 8 which mechanically acts upon the slider 5, through the disk 3, and the accuracy of the position is ensured by the concurrent action of the spring 7 which acts, in the other direction, on the slider 5 through the disk 3 and the spreader 4 abutting against the body 1.

The helical spring 7 is preferably cylindrical, has as its fixed abutment the planar surface as obtained on tthe magnetic counter-armature 19 and rests externally with numerous convolutions against the hollow cylindrical surface of the counter-armature 19 which thus acts also as a spring guide, preventing the spring 7 from being bent.

As the electromagnetic valve is energized, by feeding with current the coil 15, the movable armature 17 is attracted towards the magnetic counter-armature 19 and urges, through the pusher 16, the slider 5 which is compelled to slide relative to the body 1.

The slider 5 goes on until the armature 17 and the rod 16 can be advanced; as the armature 17 enters frontally in contact with the fixed counter-armature 19 its motion is stopped and thus also the advance of the slider 5 which is prevented from further advancing by the spring 8; the counter-armature 19 is the end of stroke of the armature 17 and thus also of the slider 5.

During the advance stage of the slider 5 the spring 8 is loaded and is thus enabled to bring the slider 5 again to its original position as the attraction action is discontinued between the armature 17 and the counter-armature 19.

During the backward motion of the slider 5 under the bias of the spring 8 a similar movement of the armature 17 is imperative.

With reference to FIG. 2, the positioning to the at rest position of the slider 5 is obtained by the springs 7 acting thereon by the disks 3 which are directly in abutting contact with the body 1.

As the electromagnetic valve is energized by sending current to the coil 15 placed at either end of the body valve 1, the movable armature 17 is attracted towards the magnetic counter-armature 19 and thrusts, by means of the pusher 16, the slider 5 which is compelled to slide relatively to the body 1 and pushes in turn the armature 17 placed on the other side.

The stoppage of the motion of the slider 5 takes place as the armature 17, placed on the side where there is the energized coil 15, enters into contact with its counter-armature 19.

During the advance stage of the slider 5 the spring 7 is loaded which is on the side away of that where there is the energized coil 15: the spring 7 is thus capable of bringing the slider 5 to its original position again as the attraction action between the armature 17 and the counter-armature 19 is discontinued.

By imparting a thrust action, by an appropriate tool, on the hand actuated pusher 6, the armature 17 is caused to advance and thus, through the rod 16, causes the slider 5 to advance.

With reference to FIGS. 5, 6 and 7, where a preferred embodiment is shown of the valve when the energization of the coil 22 is made with AC, the pressure-tight cylinder is formed by a tube 30 made of magnetically inert stainless steel, to a side of which there is affixed, by welding or brazing, the closure plug 31, which contains also the manual pusher 6 and the gasket 9 and there is affixed on the other side, by welding or brazing the annular member 32 formed by active magnetic material.

The movable magnetic armature is formed by a pack of magnetic metal sheets 33 superposed and packed by two thick metal sheets 34 which are clamped by the rivets 35.

The movable armature thus formed has, inserted in its base piece the rod 16 and, on its front face the magnetic counter-armature carries the short circuiting ring 36.

The sheet metal packs 33 and 34 are so processed that they can slide within the tube 30 with a wide portion of its cylindrical side surface in contact.

The magnetic counter-armature is formed by magnetic metal sheets 37, packed at their ends by thick metal sheets 38 which are clamped by rivets 40: this pack is machined so as to have it round with different diameters so that the pack can be made fast by welding or brazing to the portion 39 which has the shape of a solid of rotation, obtained by machining on a lathe, and having a cavity in which the sheet metal pack 37 and 38 rests.

The assembly of these parts 37, 38, 39 and 40 makes up the magnetic counter-armature.

This embodiment of the electromagnetic valve the subject of the present invention is particularly preferred in the case in which the coil 15 is fed with AC since there are no solid iron pieces on which alternating magnetic flux lines may impinge.

The result, in fact, is that the metal sheets 33, 34, 37 and 38 have a slight thickness with respect to the direction perpendicular to the principal lines of magnetic flux and thus cannot be the seat of eddy currents of a considerable magnitude; the tube 30 which is also coaxial with the principal lines of magnetic flux is not substantially involved in the circulation of eddy currents since it is formed by a material in the group of stainless steels.

The magnetic continuity existing between the hood 25, the annular sheet metal pieces 26, the parts 32, 37, 38 and 39, acts in such a way that when the metal sheets 33 and 34 are frontally in contact with the metal sheets 37 and 38 it becomes possible to institute a magnetic field of a high intensity without having the electric coil 22 with high magnitude electric currents flowing therethrough.

The short circuiting ring 36 has AC currents flowing therethrough as induced therein by the variations of magnetic flux; these currents generate, in their turn, a magnetic flux which is substantially phase-shifted with the original magnetic field and thus ensures the existence of an attraction force between the magnetic counter-armature and the magnetic armature irrespective of the phase of the energizing current and thus of the original magnetic field.

With reference to FIGS. 8, 9 and 10 where there is shown a preferred embodiment of the valve when the energization of the coil 22 is made with DC current, the pressure-tight cylinder is formed by the annular member 43, formed by magnetically inert stainless steel, welded between the parts 41 and 43.

The part 41 has the shape of a hollow cylinder, is made of a magnetically active material, contains the hand-actuated pusher 6 and the gasket 9 and is near the straight side of the annular portion 42 which has a wall-cross-section which can be assimilated to a rectangular trapezium, whose oblique side is contiguous to the portion 43, the latter being formed by a magnetically active material.

The movable magnetic armature 44 has the shape of a straight cylinder in which there is coaxially inserted the rod 16 and slides in the pressure-tight cylinder as formed by the portions 41, 42 and 43 with its entire side surface in contact; in the magnetic armature 44 there are formed one or more axial bores 45 through which the hydraulic fluid can flow; the magnetic counter-armature 19 is a solid body of rotation formed by lathe machining with a coaxial bore through which the rod 16 is passed. This embodiment of the electromagnetic valve of the present invention is particularly preferred in the case where the coil 15 is fed with DC since it has a very low value of magnetic impedance.

As matter of fact the magnetic flux lines are closed along a route comprising the pieces 25 and 26 of the coil 15, the piece 41, the armature 44, the piece 43 or the counter-armature 19 and the piece 43.

In addition the magnetic portion 43 is sized so as to be extended beyond the counter-armature 19 and to have towards the magnetic armature 44 an edge whose wall cross section is at an acute angle so as to concentrate thereon the magnetic flux lines as the armature 44 is far from the counter-armature 19.

What is claimed is:

1. A hydraulic valve actuated directly by at least one electromagnetic apparatus and comprising a valve body having a plurality of channels for the flow of hydraulic fluid, at least one of said channels being normall filled with the fluid; a slider which axially slides within said valve body and controls the outflow of hydraulic fluid; springs arranged axially with said slider and acting thereon; at least one round magnetic counter-armature disposed coaxial with said slider, said counter-armature having a radially outwardly extended flange which rests against said valve body, a coaxial round cavity facing said slider and having a coaxial bore; a tubular member coaxial with said counter-armature and surrounding said counter-armature, said tubular member having selected magnetic properties and having at one of its ends a portion extending radially outwardly an at the other of its ends a thick wall plug; a prismatic movable magnetic armature slidable in said tubular member; a rod-like pusher passing through said bore of said counter-armature and connecting said movable armature with said slider; a manual pusher slidably mounted in an axial bore of said thick wall plug coaxial with and protruding inwardly of said tubular member; an electric coil mounted on said tubular member in coaxial relationship; a magnetic tube portion surrounding said coil in coaxial and radially spaced relationship with said coil, said magnetic tube portion being axially slotted; at least two superposed magnetic metal disk packs disposed coaxial with said tubular member and extending radially at both ends of said magnetic tube portion between said magnetic tube portion and said tubular member; a molded plastic casing enclosing said magnetic tube portion, said superposed magnetic metal disk packs and said coil; means for connecting said electric coil to an electric source; means for fastening said tubular member and said counter-armature to said valve body; means for fastening said molded plastic casing to said tubular member; sealing means for preventing oozing of hydraulic fluid between said valve body, said counter-armature and said tubular member; and sealing means for preventing oozing of hydraulic fluid between said thick wall plug and said manual pusher.

2. A hydraulic valve according to claim 1, characterized in that said magnetic movable armature has a straight prismatic form of which form a straight cross section is inscribed in a circumference having a diameter equal to the inside diameter of said tubular member and has straight section area of at least 4/5 of the circle having a diameter equal to the inside diameter of said tubular member.

3. A hydraulic valve according to claim 1, characterized in that said movable magnetic armature slides in said tubular member and has at least ⅔ of its lateral surface in contact with the inside wall of said tubular member.

4. A hydraulic valve according to claim 1, characterized in that said movable magnetic armature slides wihtin said tubular member and is constituted by magnetic material having preferential magnetic conduction lines lying in planes parallel to the axis of said tubular member.

5. A hydraulic valve according to claim 1, characterized in that said movable magnetic armature slides within said tubular member and is constituted at least partially by superposed magnetic metal sheets connected by fastening means and oriented parallel to the axis of said tubular member.

6. A hydraulic valve according to claim 1, characterized in that said movable magnetic armature has in its end facing towards said counter-armature a circular groove containing a closed profile of material good conduction of electric current, said groove enclosing a surface of an area greater than one half of the area of the interior cross section of said tubular member.

7. A hydraulic valve according to claim 1, characterized in that said rod-like pusher is solid with said movable magnetic armature, emerges from the chamber defined by said tubular member and said counter-armature through said axial bore and merely rests against said slider.

8. A hydraulic valve according to claim 1, characterized in that said rod-like pusher is formed of diamagnetic metal.

9. A hydraulic valve according to claim 1, characterized in that said round magnetic core has a cylindrical portion surrounded by said tubular member and formed of magnetic material having preferential magnetic conduction lines lying in planes parallel to the axis of said tubular member.

10. A hydraulic valve according to claim 1, characterized in that said counter-armature is partly constituted of magnetic metal sheets superposed and oriented parallel to the axis of said tubular member and partly of a part including said radially outwardly extended flange, said magnetic metal sheets being connected to said part by fastening means.

11. A hydraulic valve according to claim 1, characterized in that said counter armature has on its end facing towards said movable magnetic armature a circular groove containing a closed profile of material good conductor of electricity, said groove enclosing a surface of over one half of the surface of a circle having a diameter equal to the inside diameter of said tubular member.

12. A hydraulic valve according to claim 1, characterized in that said round cavity of said counter-armature has an inner end facing towards said slider, one of said springs acting on said slider being disposed within said round cavity, and said round cavity inner end forms a fixed abutment for said spring.

13. A hydraulic valve according to claim 1 characterized in that said spring is cylindrical and has a considerable number of convolutions resting against the cylindrical surface of said round cavity.

14. A hydraulic valve according to claim 1, characterized in that said tubular member is formed of selected magnetic material and has diamagnetic properties in its central portion and magnetic properties at at least one of its end portions.

15. A hydraulic valve according to claim 1, characterized in that said magnetic tube portion is axially slotted along at least the two thirds of its length.

16. A hydraulic valve according to claim 1, characterized in that said magnetic tube portion has its outside diameter in a relationship of about 1.1 to 1 relatively to its inside diameter.

17. A hydraulic valve according to claim 1, characterized in that said superposed magnetic metal disk packs are constituted by at least two sheet metal disks superposed upon one another and made integral by fasteners which are passed through said sheet metal disks.

18. A hydraulic valve according to claim 1, characterized in that said superposed magnetic metal disk packs, and the individual disks thereof, have a slot in radial direction which extends along at least one half of the difference between the outside diameters of said magnetic tube portion and said tubular member.

19. A hydraulic valve according to claim 1, characterized in that each of said superposed magnetic metal disk packs has a thickness in its axial direction which is in a ratio of about 1 to 4 with the outside diameter of said magnetic tube portion.

20. A hydraulic valve according to claim 1, characterized in that said means for connecting said electric coil to said electric source are placed on the outer cylindrical surface of said molded plastic casing.

21. A hydraulic valve according to claim 1, characterized in that said sealing element means are merely rings of sealing materials having required properties of resiliency and chemical resistance with respect to the hydraulic fluids used.

22. A hydraulic valve according to claim 1, characterized in that said manual pusher protrudes from and slides inwardly of said tubular member and is constituted by diamagnetic material.

* * * * *